U S010399543B2

United States Patent
Hermann

(10) Patent No.: US 10,399,543 B2
(45) Date of Patent: Sep. 3, 2019

(54) METHOD FOR RELEASING ONE OR MORE FUNCTIONS IN A VEHICLE

(71) Applicant: Continental Automotive GmbH, Hannover (DE)

(72) Inventor: Stefan Hermann, Neunkirchen am Brand (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/065,686

(22) PCT Filed: Dec. 19, 2016

(86) PCT No.: PCT/EP2016/081664
§ 371 (c)(1),
(2) Date: Jun. 22, 2018

(87) PCT Pub. No.: WO2017/108660
PCT Pub. Date: Jun. 29, 2017

(65) Prior Publication Data
US 2019/0001927 A1  Jan. 3, 2019

(30) Foreign Application Priority Data
Dec. 23, 2015  (DE) .................. 10 2015 226 631

(51) Int. Cl.
*B60R 25/24* (2013.01)
*B60H 1/00* (2006.01)
*G07C 9/00* (2006.01)

(52) U.S. Cl.
CPC ........ *B60R 25/245* (2013.01); *B60H 1/00657* (2013.01); *B60R 2325/205* (2013.01); *G07C 9/00111* (2013.01)

(58) Field of Classification Search
None
See application file for complete search history.

(56) References Cited

U.S. PATENT DOCUMENTS

| | | |
|---|---|---|
| 10,059,305 B2 | 8/2018 | Imamura |
| 2009/0206989 A1* | 8/2009 | Leitch ................. B60R 25/24 340/5.61 |
| 2014/0330449 A1* | 11/2014 | Oman ................ G01S 13/765 701/2 |
| 2014/0340193 A1* | 11/2014 | Zivkovic ........... G07C 9/00111 340/5.61 |
| 2015/0015423 A1* | 1/2015 | Takeuchi ............. G08G 1/005 340/989 |
| 2015/0120151 A1 | 4/2015 | Akay et al. |
| 2016/0075307 A1* | 3/2016 | Jakobsson ........... B60R 25/31 701/2 |

(Continued)

OTHER PUBLICATIONS

International Search Report and Written Opinion dated Mar. 30, 2017 from corresponding International Patent Application No. PCT/EP2016/081664.

*Primary Examiner* — Carlos Garcia

(57) ABSTRACT

The invention relates to a method for enabling one or more functions (FT) in a vehicle (FZ), in particular in a motor vehicle. The method involves one or more prescribed radio signals (FS) being transmitted from a mobile identification transmitter (IDG) and/or a device coupled to the mobile identification transmitter (IDG) to a vehicle-based evaluation device (STF).

14 Claims, 2 Drawing Sheets

(56) References Cited

U.S. PATENT DOCUMENTS

Figure 1:
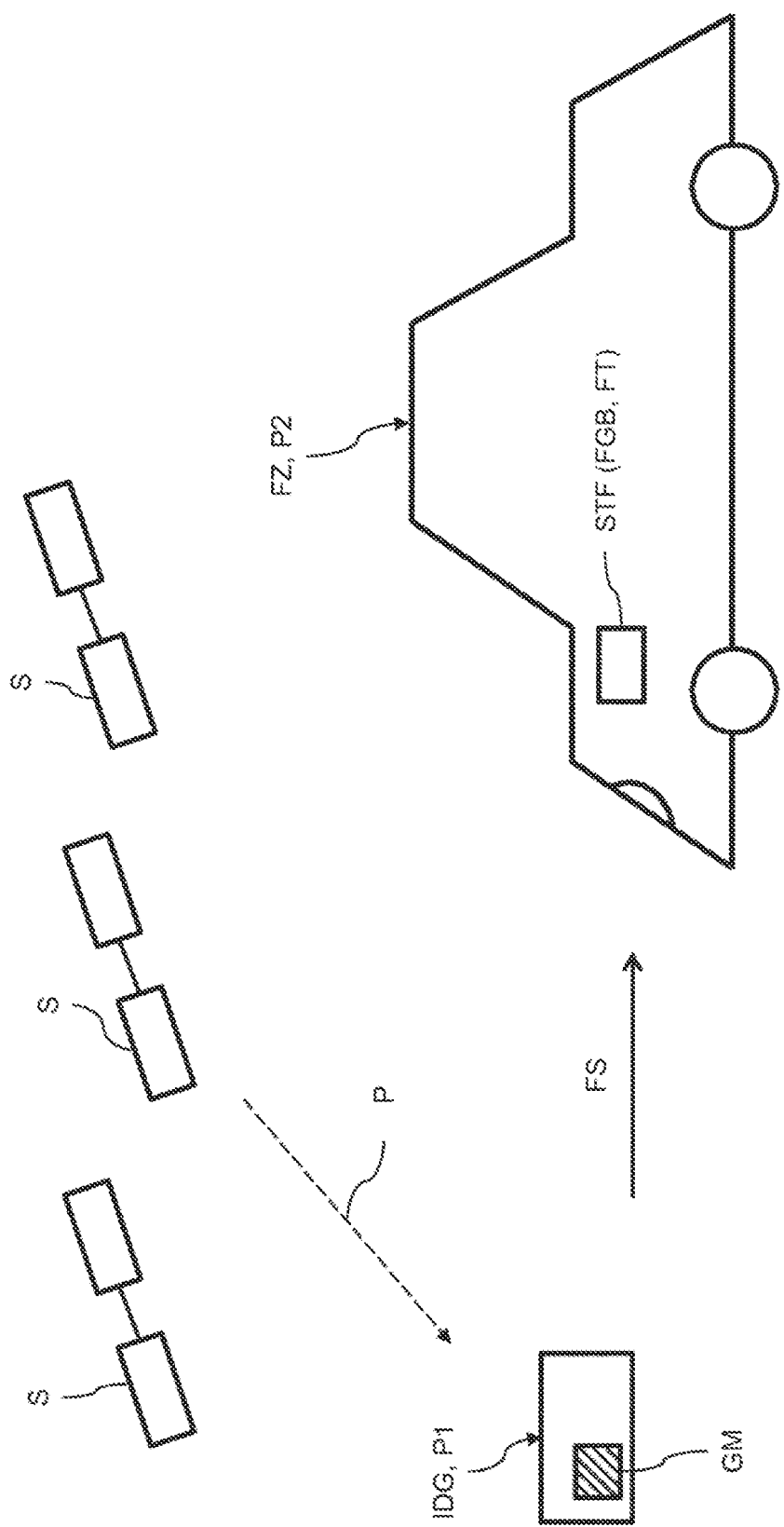

2016/0086401 A1\* 3/2016 Choi ................... H04W 12/08
  340/5.61
2016/0189458 A1 6/2016 Lee
2017/0303084 A1\* 10/2017 Bruckner ............. B60R 25/248

\* cited by examiner

METHOD FOR RELEASING ONE OR MORE FUNCTIONS IN A VEHICLE

The invention relates to a method and an arrangement for enabling one or more functions in a vehicle, in particular in a motor vehicle.

The prior art discloses various approaches in order to allow a user of a vehicle to use a mobile (i.e. portable) identification transmitter to initiate actions on the vehicle.

Inter alia, there are entry authorization systems or entry arrangements in vehicles that involve the user being authenticated by virtue of a data communication being effected between a first communication device of the vehicle and a second communication device in the mobile identification transmitter of the user, such as a key or key fob. In this case, the mobile identification transmitter in an active entry arrangement sends control signals and an identification code to the vehicle, for example as a result of an appropriate key being pressed by the user of the mobile identification transmitter, whereupon the vehicle is unlocked or locked if the identification code is correct.

Further, passive entry arrangements are known in which a first communication device of the vehicle first of all transmits request signals at a predetermined field strength at regular intervals. Preferably, these request signals are low-frequency request signals, e.g. in the region of 125 MHz. The request signals are used to check whether a mobile identification transmitter is in a proximity region around the vehicle. When a mobile identification transmitter approaches the vehicle, so that it can receive the request signals of the vehicle, it will respond to the reception of the request signals in order to initiate an authentication process or pre-authentication process. In this case, radio signals in the MHz band and with a greater range than the request signals are sent from the identification transmitter to the vehicle. Finally, the mobile identification transmitter uses these signals to transmit its authentication code to the vehicle. If the authentication code is checked successfully in the vehicle, it is then possible for a user directly at the vehicle to operate a door handle in order to unlock the applicable vehicle door or all the vehicle doors. Since this requires no active operation of a mechanical or electrical identification transmitter or key to be performed by a user, this type of entry authorization is also referred to as a passive entry authorization check, and the applicable entry authorization systems are referred to as passive electronic entry authorization systems.

The active and passive entry arrangements just explained can possibly also be used generally in the sense that they enable active or passive functions on the vehicle that allow the initiation of particular actions on the vehicle by a user. The enabling of active functions requires the user to initiate the applicable action by performing an operating action on the mobile identification transmitter or a device coupled thereto, whereas the enabling of a passive function does not require such operation.

Arrangements for enabling active and passive vehicle functions allow the activation of the applicable functions only if the distance of the user or his identification transmitter from the vehicle is below a particular threshold. This threshold is normally provided by the radio range of the mobile identification transmitter in the case of arrangements for enabling active functions. In arrangements for enabling passive functions, the distance of the identification transmitter from the vehicle is ascertained by means of the field strength of the request signals received in the identification transmitter. In both cases, the determination of the position of the identification transmitter is imprecise, facilitating security-critical attacks for the unauthorized initiation of actions on the vehicle.

In the case of arrangements for enabling passive functions, a transponder attack can be used to feign a request signal having a high field strength to an identification transmitter that is remote from the vehicle, whereupon said identification transmitter transmits its identification code, so that an unauthorized person at the vehicle can e.g. open the motor vehicle even though the identification transmitter is at a distance from the vehicle at which entry to the vehicle should not be permitted. Arrangements for activating passive vehicle functions further have the disadvantage that a request signal constantly needs to be transmitted by the vehicle.

It is an object of the invention to provide a method and an arrangement for enabling functions in a motor vehicle that increase security against attacks by unauthorized third parties.

This object is achieved by the independent patent claims. Advantageous refinements of the invention are defined in the dependent claims.

The method according to the invention is used for enabling one or more functions in a vehicle, in particular in a motor vehicle. The method involves one or more prescribed radio signals being transmitted from a mobile or portable identification transmitter and/or a device coupled to the mobile identification transmitter to a vehicle-based evaluation device. The radio signals in this case are preferably radio-frequency signals in the MHz band.

The method according to the invention involves steps a) to d), explained below, being performed. The performance of the steps further involves the cited radio signal(s) being transmitted, the radio signals being able to be transmitted at different points in steps a) to d), depending on the embodiment, which is why this transmission is not included in the description of the steps according to claim 1. In specific embodiments according to the dependent claims, the times at which the prescribed radio signals can be transmitted are then defined.

Where steps a) to d) explained below do not specify which component carries out the applicable step, there are various options therefor, which are explained in more detail in specific embodiments. Here and below, a reference to the performance of step d) can further be understood to mean that this step also cannot result in activation of a function if none of the enable conditions explained later on are satisfied.

A step a) of the method according to the invention involves a first position being picked up, the first position being ascertained by the identification transmitter or a device coupled to the identification transmitter wirelessly (preferably by means of a short-range communication link such as Bluetooth or NFC) or possibly even by wire by means of satellite-assisted position finding. In other words, the identification transmitter or the device coupled thereto contains a satellite-assisted locating module, e.g. a GPS (Global Positioning System) module. Such a module receives satellite signals in a manner known per se and computes from these signals the position of the identification transmitter or the device coupled thereto on the earth. The device coupled to the mobile identification transmitter is a cell phone in a preferred variant.

The mobile identification transmitter and possibly the device coupled thereto are normally carried by a user of the vehicle, so that the first position defined above is consistent with the position of the user. The mobile or portable identification transmitter is preferably a very compact unit issued by the vehicle manufacturer. Nevertheless, the mobile identification transmitter may possibly also be a cell phone.

A step b) of the method according to the invention involves the positional difference (in terms of magnitude) between the first position and a second position being ascertained, the second position being consistent with the position of the vehicle. Depending on the configuration, step b) can be carried out by the identification transmitter or the coupled device or the evaluation device. The second position was preferably ascertained when the vehicle was last taken out of service, in particular when the vehicle was last locked. This position may have been determined in different ways in this case, e.g. using satellite-assisted locating by means of the navigation system of the vehicle or possibly even using a cell phone or the mobile identification transmitter, both of which are at the vehicle when it is locked.

A step c) involves checking whether one or more enable conditions are satisfied, a respective enable condition having an associated number of functions (i.e. at least one function) of the vehicle and the respective enable condition being satisfied if the positional difference is below a threshold assigned to the respective enable condition. The check in step c) can be performed by the identification transmitter or the coupled device or the evaluation device, depending on the configuration.

A step d) of the method according to the invention involves (exclusively) those functions that are associated with satisfied enable conditions being activated. The activation in this case is performed by the vehicle-based evaluation device. In a preferred variant of the method according to the invention, the activation of respective functions on the vehicle is further also made possible by manual operation by the user on the mobile identification transmitter or the device coupled thereto, so that enabling of applicable functions is also made possible e.g. in the absence of satellite reception.

The method according to the invention has the advantage that the activation of functions is coupled to very accurate ascertainment of a positional difference by means of satellite-assisted position finding. In this manner, the enabling of functions can be controlled much better and this improves the security of the method against unauthorized attacks.

In a preferred variant of the method according to the invention, the above steps a) to c) are performed in the mobile identification transmitter and/or in the coupled device, wherein satisfaction of a respective enable condition in step c) automatically results in an enable signal being transmitted as a prescribed radio signal to the vehicle-based evaluation device, as a result of which the evaluation device is prompted to enable the number of functions associated with the respective satisfied enable condition. In this embodiment, the second position is stored in the mobile identification transmitter or in the coupled device, the storage having been performed in particular when the second position was ascertained when the vehicle was last taken out of service.

In a further, particularly preferred embodiment, the enable condition or enable conditions comprise(s) at least one first enable condition whose number of associated functions comprises one or more passive vehicle functions, the activation of which allows a user to initiate one or more predetermined actions on the vehicle without operating the mobile identification transmitter and/or the device coupled to the mobile identification transmitter. The initiation in this case is performed only if an authentication code wirelessly transmitted from the mobile identification transmitter and/or the device coupled to the mobile identification transmitter to the evaluation device is successfully authenticated by the evaluation device. In other words, the actions are initiated only if the authentication code can be identified as belonging to the vehicle.

In a further variant of the method according to the invention, the passive vehicle function or the passive vehicle functions comprise(s) a passive entry function for the vehicle, the activation of which allows a user to unlock and operate (in particular start) the vehicle without operating the mobile identification transmitter and/or the device coupled to the mobile identification transmitter. The threshold assigned to the enable condition for the passive entry function is preferably in the region of 2 m or less.

In a further variant of the method according to the invention, the passive vehicle function or the passive vehicle functions comprise(s) visual and/or audio signal output by the vehicle, in particular switch-on of lighting on the vehicle. This allows in particular the function of what is known as a welcome light to be performed, which results in the lighting apparatus of the vehicle briefly switching on when the user approaches. The threshold assigned to the enable condition for the visual or audio signal output is preferably 20 m or less. Preferably, this threshold is higher than the threshold for the passive entry function, since the function of the visual or audio signal output is less security-critical.

In a further variant of the method according to the invention, the enable condition or enable conditions comprise(s) at least one second enable condition whose number of associated functions comprises one or more active vehicle functions, the activation of which allows a user to initiate one or more predetermined actions on the vehicle by operating the mobile identification transmitter and/or the device coupled to the mobile identification transmitter, provided that an authentication code wirelessly transmitted from the mobile identification transmitter and/or the device coupled to the mobile identification transmitter to the evaluation device is successfully authenticated by the evaluation device. In particular, the active vehicle function relates to the function of the active entry arrangement explained at the outset. The threshold assigned to the enable condition for the active vehicle functions is preferably 10 m or less. In particular, this threshold is higher than the threshold for the passive vehicle functions.

In a further preferred variant of the method according to the invention, the mobile identification transmitter and/or the device coupled to the mobile identification transmitter perform(s) step a) in response to wirelessly received request signals of the vehicle and subsequently transmit(s) as a prescribed radio signal a signal that comprises the first position, whereupon steps b) to d) are performed by the evaluation device. In this variant of the invention, the second position is stored in the vehicle.

In a further embodiment of the invention, the mobile identification transmitter and/or the device coupled to the mobile identification transmitter perform(s) steps a) and b) in particular in response to wirelessly received request signals of the vehicle and subsequently transmit(s) as a prescribed radio signal a signal that comprises the positional difference, whereupon steps c) and d) are performed by the evaluation unit. In this variant, the second position is stored in the mobile identification transmitter and/or in the coupled device.

The last two embodiments explained allow more accurate ascertainment of the distance from the vehicle and hence improved performance of passive vehicle functions on account of the satellite-assisted position finding.

In a further variant of the method according to the invention, the enable condition or enable conditions comprise(s) at least one third enable condition whose number of associated functions comprises transmission of request signals by the vehicle, provided that an authentication code wirelessly transmitted from the mobile identification transmitter and/or the device coupled to the mobile identification transmitter to the evaluation device is successfully authenticated by the evaluation device. The transmission of the request signals in this case can be prompted e.g. automatically by means of an enable signal transmitted by the identification transmitter or a device coupled thereto if the positional difference is below the applicable threshold and at the same time the authentication code transmitted e.g. with the enable signal can also be authenticated successfully. If need be, however, there is also the possibility of the transmission of the request signals being prompted manually by an operating action by the user on the identification transmitter or on the device coupled thereto. This operating action initiates the sending of an enable signal to the evaluation device. In both cases, the transmission of the request signals is permitted only if the enable condition is satisfied, i.e. if the positional difference is below the applicable threshold.

The request signals just mentioned are used for the enabling of at least one passive vehicle function, the activation of the at least one passive vehicle function allowing a user to initiate one or more predetermined actions on the vehicle without operating the mobile identification transmitter and/or the device coupled to the mobile identification transmitter, provided that an authentication code wirelessly transmitted from the mobile identification transmitter and/or the device coupled to the mobile identification transmitter to the evaluation device is successfully authenticated by the evaluation device. The activation of the at least one passive vehicle function takes place whenever the request signals are received by the mobile identification transmitter or the device coupled thereto and the distance between the identification transmitter or the coupled device and the vehicle is below a predetermined threshold. The activation of the passive vehicle function in this case can possibly be produced by means of the method according to the invention, but also in a conventional manner without satellite-assisted position finding.

In a further, particularly preferred embodiment, steps a) to d) of the method according to the invention are repeated at predetermined intervals of time, so that it is detected in good time when the applicable enable condition is satisfied.

Besides the method described above, the invention relates to an arrangement for activating one or more functions in a vehicle, in particular in a motor vehicle, comprising a vehicle-based evaluation device and a mobile identification transmitter, wherein the arrangement is set up to transmit one or more prescribed radio signals from the mobile identification transmitter and/or a device coupled to the mobile identification transmitter to the vehicle-based evaluation device. Further, the arrangement is set up to perform the steps a) to d) of the method according to the invention.

In a preferred variant, the arrangement just described can perform one or more preferred embodiments of the method according to the invention.

The invention relates furthermore to a vehicle, in particular a motor vehicle, that comprises the arrangement according to the invention.

An exemplary embodiment of the invention will be described in detail below with reference to the appended figures.

Figure 2:
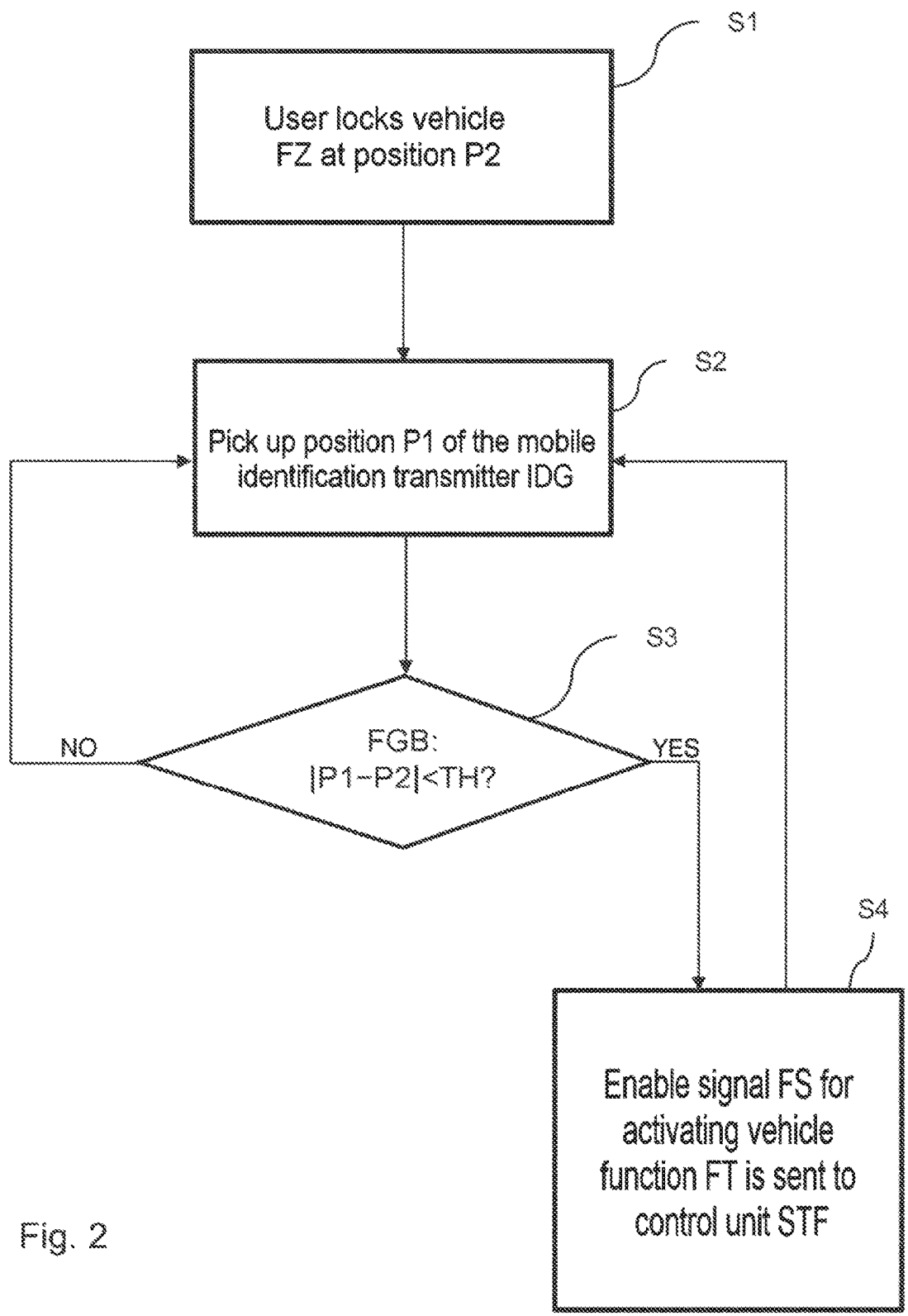

In the drawings:

FIG. 1 shows a schematic depiction of a passive entry system for a motor vehicle that is produced according to an embodiment of the invention; and FIG. 2 shows a flowchart clarifying the essential steps when entering the motor vehicle using the entry system of FIG. 1.

A variant of the invention is explained below on the basis of a passive entry system for a motor vehicle in which a user can unlock and start said motor vehicle without operating a mobile identification transmitter when at a sufficiently short distance from the motor vehicle.

Conventionally, passive entry systems are produced by virtue of low-frequency short-range request signals being continually transmitted by the motor vehicle. If such request signals can be received by the mobile identification transmitter (i.e. if the identification transmitter is in range of the request signals), an authentication code of the identification transmitter is transmitted to the motor vehicle using a radio-frequency radio signal having a longer range. The radio signal in this case also contains the field strengths of the received request signals. This allows a vehicle-based evaluation device to establish what distance the identification transmitter is from the motor vehicle. If this distance is below a particular threshold, the user can unlock and start up the motor vehicle without operating the mobile identification transmitter. A disadvantage of this conventional passive entry system is that it continually requires request signals, resulting in a high energy consumption in the motor vehicle. These request signals are no longer required for the variant of the invention that is explained here.

FIG. 1 shows a variant of a passive entry system according to the invention for the motor vehicle FZ. The entry system comprises a mobile identification transmitter IDG and a vehicle-based control unit STF, which is consistent with an evaluation device as in claim 1. Both the mobile identification transmitter IDG and the vehicle-based control unit STF comprise transmission/reception devices for radio signals transmitted between these components.

In the scenario of FIG. 1, the vehicle FZ was switched off at the (second) position P2, and the position of the vehicle was determined, e.g. in a manner coupled to its locking, when the vehicle was switched off. Preferably, this position finding is performed by means of the navigation appliance of the vehicle. During locking, this position was further wirelessly transmitted to the mobile identification transmitter IDG. The identification transmitter IDG is carried by the user of the vehicle, who, in the scenario of FIG. 1, is currently at the position P1 remote from the vehicle.

The identification transmitter IDG is distinguished in that it contains a GPS module GM that it can use to pick up its position by means of received satellite signals. This satellite-assisted position finding is indicated by the depiction of multiple satellites S and the arrow P, which represents the reception of satellite signals in the GPS module. The passive entry to the motor vehicle Z further involves a radio signal FS being transmitted from the identification transmitter IDG to the vehicle-based control unit STF. Further, the vehicle-based control unit and also the mobile identification transmitter store an enable condition FGB for the passive entry function, the passive entry function being denoted by FT in FIG. 1.

The enabling of the entry function FT in the scenario of FIG. 1 is explained below with reference to the flowchart of FIG. 2. In a step S1, the user locks his vehicle FZ at the position P2, as has already been explained above. This position P2 is stored in the mobile identification transmitter IDG. At a later time, indicated by step S2, the user approaches the vehicle again, whereupon the position P1 of the mobile identification transmitter IDG is picked up by the GPS module GM. Pickup of this position is repeated by the GPS module at regular intervals in this case.

In step S3, the enable condition FGB for the passive entry function FT is checked in the mobile identification transmitter IDG. This enable condition is satisfied if the difference in terms of magnitude between the positions P1 and P2 is below a prescribed threshold TH. If this enable condition is not satisfied, the user cannot unlock the motor vehicle and the process returns to step S2 in order to determine the possibly altered position P2 again by means of the GPS module GM.

Should the enable condition FGB be satisfied, on the other hand, step S4 involves the enable signal FS indicated in FIG. 1 being sent to the control unit STF to activate the passive entry function FT. The passive entry function is then enabled, meaning that the user can unlock and start the vehicle without further operation of the identification transmitter IDG. In this case, it should be borne in mind that unlocking and starting of the vehicle is further possible only if an identification code that the enable signal contains for the identification transmitter can be successfully authenticated in the control unit STF, which is the case in the scenario considered here.

Subsequently, the process returns to step S2 again in order to continue to monitor the position P1, so that, in the event of the positional difference no longer satisfying the enable condition FGB at a later time, the passive entry function is deactivated again.

The above-described embodiments of the invention have numerous advantages. In particular, satellite-assisted position finding allows very accurate ascertainment of a positional difference between a mobile identification transmitter and a vehicle, so that it is very easy to check whether enable conditions coupled to this positional difference are satisfied. The enabling of vehicle functions is therefore better protected against attacks by unauthorized third parties. Furthermore, in particular variants of the invention, it is also possible for a passive entry arrangement for a vehicle to be provided that no longer requires the transmission of request signals by the vehicle. This lowers the power consumption of the vehicle.

LIST OF REFERENCE SIGNS

IDG mobile identification transmitter
P1 position of the mobile identification transmitter
GM GPS module
FS radio signal
FZ vehicle
P2 position of the vehicle
STF vehicle-based control device
FGB enable condition
FT vehicle function
S satellites
P arrow
TH threshold

The invention claimed is:

1. A method for enabling one or more functions in a vehicle wherein the method involves one or more prescribed radio signals being transmitted from at least one of a mobile identification transmitter and a device coupled to the mobile identification transmitter to a vehicle-based evaluation device, wherein the method comprises:

a) picking up a first position, the first position being ascertained by the identification transmitter or the device coupled to the identification transmitter by means of satellite-assisted position finding;
b) ascertaining a positional difference between the first position and a second position, the second position having been ascertained and stored when the vehicle was last locked and being consistent with the position of the vehicle;
c) checking whether at least one enable condition is satisfied, a respective enable condition having an associated number of functions of the vehicle and the respective enable condition being satisfied if the positional difference is below a threshold assigned to the respective enable condition;
d) activating by the evaluation device those functions that are associated with satisfied enable conditions;
wherein at least one of the mobile identification transmitter and the device coupled to the mobile identification transmitter performs steps a) and b) and subsequently transmits a prescribed radio signal that comprises the positional difference, whereupon steps c) and d) are performed by the evaluation device.

2. The method as claimed in claim 1, wherein the enable condition comprises at least one first enable condition whose number of associated functions comprises at least one passive vehicle function, the activation of which allows a user to initiate at least one predetermined action on the vehicle without operating at least one of the mobile identification transmitter and the device coupled to the mobile identification transmitter, provided that an authentication code wirelessly transmitted from at least one of the mobile identification transmitter and the device coupled to the mobile identification transmitter to the evaluation device is successfully authenticated by the evaluation device.

3. The method as claimed in claim 2, in which the at least one passive vehicle function comprises a passive entry function for the vehicle, the activation of which allows a user to unlock and operate the vehicle without operating at least one of the mobile identification transmitter and the device coupled to the mobile identification transmitter.

4. The method as claimed in claim 2, in which the at least one passive vehicle function comprises at least one of visual and audio signal output by the vehicle.

5. The method as claimed in claim 1, wherein the enable condition comprises at least one second enable condition whose number of associated functions comprises at least one active vehicle function, the activation of which allows a user to initiate at least one predetermined action on the vehicle by operating at least one of the mobile identification transmitter and the device coupled to the mobile identification transmitter, provided that an authentication code wirelessly transmitted from at least one of the mobile identification transmitter and the device coupled to the mobile identification transmitter to the evaluation device is successfully authenticated by the evaluation device.

6. The method as claimed in claim 1, wherein at least one of the mobile identification transmitter and the device coupled to the mobile identification transmitter performs steps a) and b) in response to wirelessly received request signals of the vehicle and subsequently transmits as a prescribed radio signal the signal that comprises the positional difference, whereupon steps c) and d) are performed by the evaluation device.

7. The method as claimed in claim 1, wherein the at least one enable condition comprises at least one third enable condition whose number of associated functions comprises transmission of request signals by the vehicle, provided that an authentication code wirelessly transmitted from at least one of the mobile identification transmitter and the device coupled to the mobile identification transmitter to the evaluation device is successfully authenticated by the evaluation device, wherein the request signals are configured to be used for the enabling of at least one passive vehicle function, wherein the activation of the at least one passive vehicle function allows a user to initiate at least one predetermined action on the vehicle without operating at least one of the mobile identification transmitter and the device coupled to the mobile identification transmitter, provided that an authentication code wirelessly transmitted from at least one of the mobile identification transmitter and the device coupled to the mobile identification transmitter to the evaluation device is successfully authenticated by the evaluation device.

8. The method as claimed in claim 1, wherein the second position is a position that was ascertained when the vehicle was last taken out of service.

9. The method as claimed in claim 1, wherein at least one of the mobile identification transmitter and the device coupled to the mobile identification transmitter is a cell phone.

10. The method as claimed in claim 1, wherein steps a) to d) are repeated at predetermined intervals of time.

11. An arrangement for activating one or more functions in a vehicle comprising a vehicle-based evaluation device and a mobile identification transmitter, wherein the arrangement is configured to transmit at least one prescribed radio signal from the mobile identification transmitter and a device coupled to the mobile identification transmitter to the vehicle-based evaluation device and in so doing, further, to carry out the following steps:
   a) picking up a first position, the first position being ascertained by at least one of the identification transmitter and the device coupled to the identification transmitter with satellite-assisted position finding;
   b) ascertaining a positional difference between the first position and a second position, the second position having been ascertained and stored when the vehicle was last locked and being consistent with the position of the vehicle;
   c) checking whether at least one enable condition is satisfied, a respective enable condition having an associated number of functions of the vehicle and the respective enable condition being satisfied if the positional difference is below a threshold assigned to the respective enable condition;
   d) activating using the evaluation device those functions that are associated with satisfied enable conditions;
   wherein at least one of the mobile identification transmitter and the device coupled to the mobile identification transmitter performs steps a) and b) and subsequently transmits a prescribed radio signal that comprises the positional difference, whereupon steps c) and d) are performed by the evaluation device.

12. An arrangement for activating one or more functions in a vehicle comprising a vehicle-based evaluation device and a mobile identification transmitter, wherein the arrangement is configured to transmit at least one prescribed radio signal from the mobile identification transmitter and a device coupled to the mobile identification transmitter to the vehicle-based evaluation device and in so doing, further, to carry out the following steps:
   a) picking up a first position, the first position being ascertained by at least one of the identification transmitter and the device coupled to the identification transmitter with satellite-assisted position finding;
   b) ascertaining and storing a second position when the vehicle is being locked and ascertaining a positional difference between the first position and the second position, the second position being consistent with the position of the vehicle;
   c) checking whether at least one enable condition is satisfied, a respective enable condition having an associated number of functions of the vehicle and the respective enable condition being satisfied if the positional difference is below a threshold assigned to the respective enable condition;
   d) activating using the evaluation device those functions that are associated with satisfied enable conditions;
   wherein the arrangement is configured to perform the method as claimed in claim 2.

13. A vehicle comprising the arrangement as claimed in claim 11.

14. A vehicle comprising the arrangement as claimed in claim 12.

* * * * *